United States Patent [19]

Eichelsbacher et al.

[11] Patent Number: 5,584,372
[45] Date of Patent: Dec. 17, 1996

[54] FRICTION CLUTCH, SUCH AS FOR A MOTOR VEHICLE, THE FRICTION CLUTCH HAVING A CLUTCH DISC AND A PRESSURE PLATE, THE PRESSURE PLATE HAVING A BLIND HOLE FASTENING ARRANGEMENT

[75] Inventors: Peter Eichelsbacher, Dittelbrunn; Christoph Feuchter, Schweinfurt; Bernhard Stephan, Werneck, all of Germany

[73] Assignee: Fichtel & Sachs AG, Schweinfurt, Germany

[21] Appl. No.: 277,664

[22] Filed: Jul. 20, 1994

[30] Foreign Application Priority Data

Jul. 22, 1993 [DE] Germany ............... 43 24 588.9

[51] Int. Cl.⁶ .................................................. F16D 13/71
[52] U.S. Cl. ............... 192/70.18; 411/44; 411/54; 403/277; 403/383; 29/524.1; 29/525.06
[58] Field of Search ............... 192/70.18, 70.28; 411/41, 44, 45, 54, 56; 403/22, 277, 281, 383; 29/522.1, 523, 524.1, 525.06, 525

[56] References Cited

U.S. PATENT DOCUMENTS

| | | | |
|---|---|---|---|
| 3,479,072 | 11/1969 | Kosar | 411/54 X |
| 3,560,030 | 2/1971 | Macks et al. | 411/54 X |
| 4,635,775 | 1/1987 | Kohler | 192/70.18 |
| 5,175,911 | 1/1993 | Terrels et al. | 411/44 X |

FOREIGN PATENT DOCUMENTS

| | | | |
|---|---|---|---|
| 3224404 | 1/1984 | Germany . | |
| 3336158 | 4/1985 | Germany | 192/70.18 |
| 3442548 | 5/1986 | Germany . | |
| 0586967 | 4/1947 | United Kingdom . | |
| 1083585 | 9/1967 | United Kingdom . | |
| 2077385 | 12/1981 | United Kingdom . | |
| 2123499 | 2/1984 | United Kingdom . | |
| 2176549 | 12/1986 | United Kingdom | 192/70.18 |

Primary Examiner—Richard M. Lorence
Attorney, Agent, or Firm—Nils H. Ljungman and Associates

[57] ABSTRACT

A friction clutch having tangential leaf springs which are fastened by means of blind hole rivets, on one hand to the pressure plate, and on the other hand to the clutch housing, whereby the blind hole in the pressure plate is conical.

18 Claims, 7 Drawing Sheets

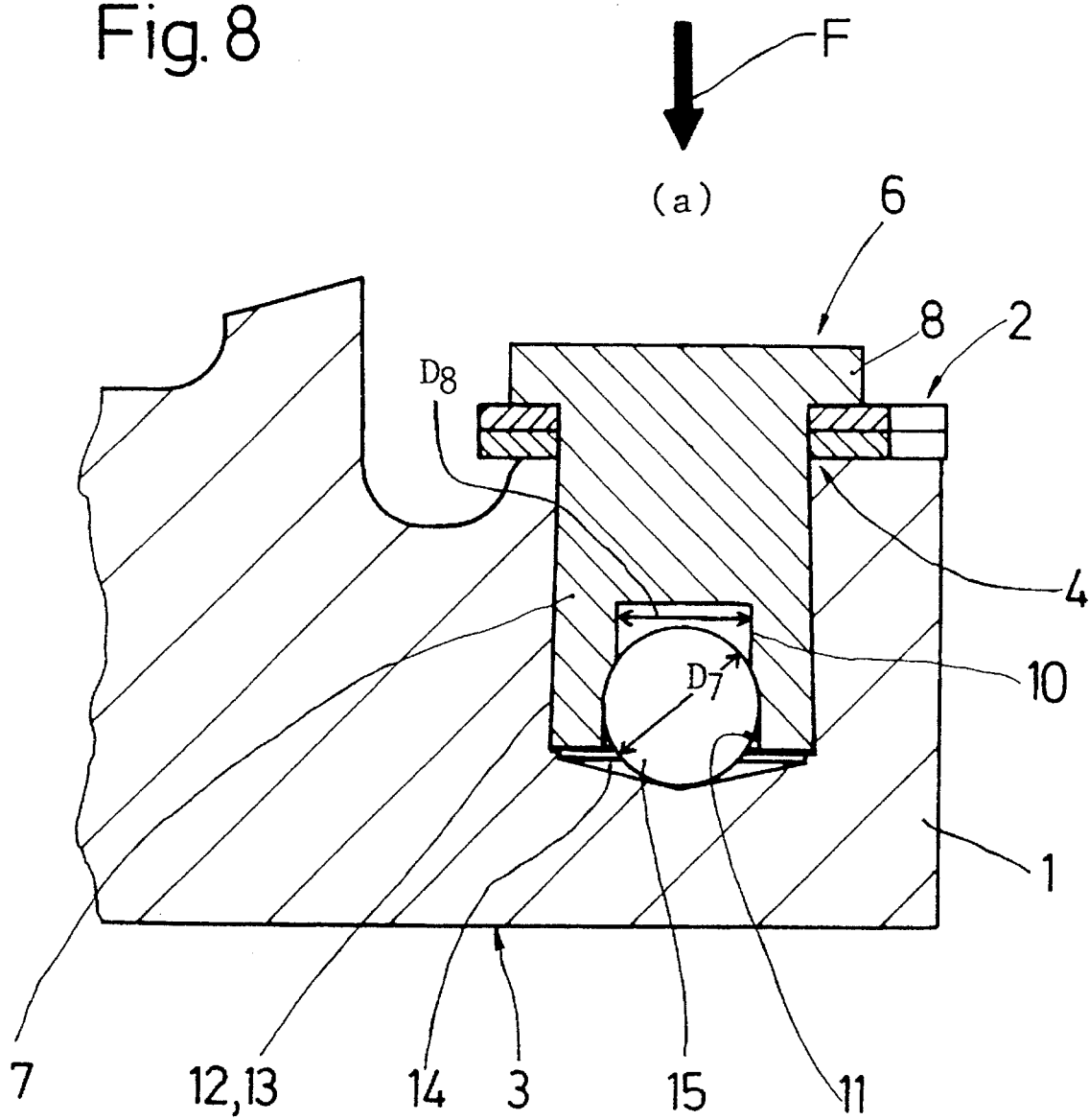

FRICTION CLUTCH, SUCH AS FOR A MOTOR VEHICLE, THE FRICTION CLUTCH HAVING A CLUTCH DISC AND A PRESSURE PLATE, THE PRESSURE PLATE HAVING A BLIND HOLE FASTENING ARRANGEMENT

BACKGROUND OF THE INVENTION

1. Field of the Invention

This invention generally relates to a friction clutch having a pressure plate, the pressure plate being located in a clutch housing so that is substantially non-rotatable but axially movable. The pressure plate is pressurized by a clutch spring, tangential leaf springs, or other components which are fastened on one hand to the clutch housing, and on the other hand to the side of the pressure plate facing the friction surface of the pressure plate. The tangential leaf springs are preferably fastened by means of a blind hole rivet having a pin-like segment, which blind hole rivet penetrates a corresponding hole in the tangential leaf spring, and which blind hole rivet is in contact with the tangential leaf spring by means of a collar on the side of the tangential leaf spring facing away from the pressure plate. The blind hole rivet, with its pin-like segment, is placed in a blind hole and is plastically deformed radially, the blind hole being located inside the radial extension of the friction surface of the pressure plate.

2. Background Information

A friction clutch of the type described above is disclosed, for example, in German Patent 32 24 404, which proposes the use of contours for the correct and reliable axial anchoring of the blind hole rivet in the blind hole. The material of the blind hole rivet is plastically deformed into these contours.

OBJECT OF THE INVENTION

The object of the present invention is to improve the axial anchoring of the blind hole rivet in the blind hole, so that the shaping and machining of the individual parts, in particular the manufacture of the blind hole, can preferably be simplified.

SUMMARY OF THE INVENTION

The invention teaches that this object can be achieved by means of tangential leaf springs, or other components which can be fastened to the clutch housing and to the pressure plate, which tangential leaf springs can be fastened by means of a blind hole rivet and a conically-shaped blind hole, wherein the blind hole rivet is plastically deformed within the blind hole.

The manufacture of the blind hole in a substantially conical shape can be accomplished in a single work process by drilling the blind hole with an appropriate tool. A conical blind hole can thereby be produced in a single work process with a single tool, so that the diameter of the blind hole is preferably larger in the vicinity of the base of the blind hole than the diameter of the blind hole in the vicinity of the tangential leaf springs. As a result of the plastic deformation of the pin-like portion of the blind hole rivet, at least near the base of the blind hole, a reliable anchoring of the tangential leaf springs can easily be produced, and can essentially be guaranteed.

As a result of the elimination of a thread, the connection between the tangential leaf springs and the pressure plate described above can also preferably be used with thinner-walled components, with essentially the same retaining force.

The present invention also teaches that the blind hole rivet can have an essentially continuous longitudinal hole, into which hole an anchoring element can preferably be driven. It can thereby be essentially guaranteed that the entire axial length of the blind hole rivet can preferably extend into the blind hole, so that the blind hole rivet plastically deforms radially outward, and is thus in correct contact with the wall of the blind hole.

The invention also teaches that the anchoring element can be designed as a sphere. Such a configuration has the advantage that during assembly, essentially no special attention need be paid to the position of the anchoring element, so that essentially no errors can occur during the introduction of the anchoring element and further processing. The use of the sphere can also have advantages in terms of cost, since the sphere is typically a standardized element.

The present invention also teaches that the blind hole rivet, in a terminal portion facing the base of the blind hole, can have its own blind hole into which, during the riveting process, a sphere previously placed on the bottom of the blind hole can be inserted. Such a configuration and procedure can significantly simplify the assembly process, since the sphere, which sphere can be used as an anchoring element, can be inserted into the blind hole of the blind hole rivet, even before the anchoring process begins.

In order to securely center the inserted sphere, the present invention teaches that the base of the blind hole can preferably be provided with a conical recess.

BRIEF DESCRIPTION OF THE DRAWINGS

The invention is explained in greater detail below with reference to several embodiments illustrated in the accompanying drawings, in which:

FIG. 8 shows the use of a sphere previously placed in the blind hole as the anchoring element;

DESCRIPTION OF THE PREFERRED EMBODIMENT

Figure 1:
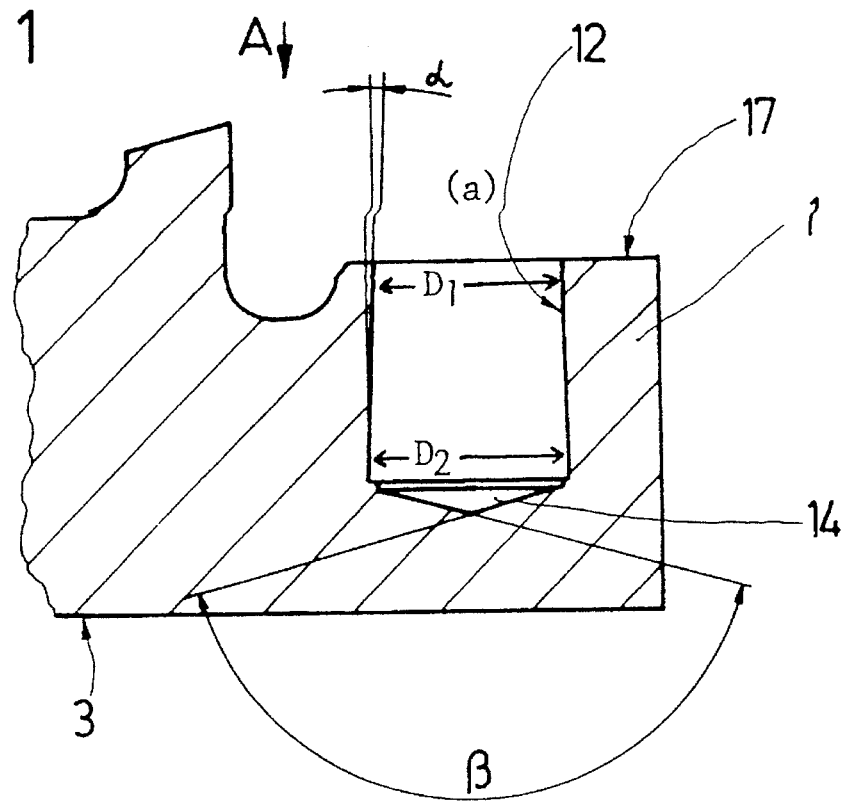
FIGS. 1 and 2 show a cross section and a plan view of a conical blind hole, respectively.
Figure 2:
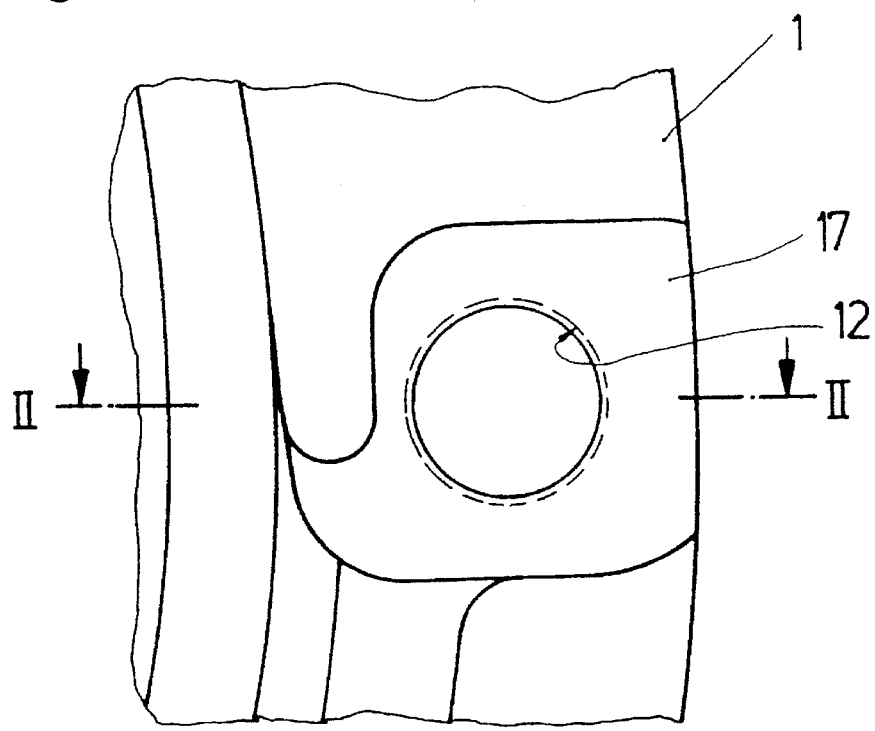

FIGS. 1 and 2 show, respectively, a partial cross section II—II and a partial view "A" of a pressure plate 1 with a blind hole 12 for the fastening of tangential leaf springs 2, or similar components, as shown installed in FIGS. 5 to 8. The pressure plate 1 can have a friction surface 3 which friction surface 3, during operation of the clutch, can preferably apply pressure to the friction linings (not shown here) of a clutch disc.

At an axial distance from the friction surface 3 of the pressure plate 1 there can be an additional surface 17 of the pressure plate 1, which additional surface 17 can act as a working face for a blind hole 12. The blind hole 12 can extend from the surface 17 toward the friction surface 3, and preferably ends before reaching the friction surface 3. The blind hole 12 can preferably be substantially conical, so that the diameter D1 of the blind hole 12, in the vicinity of the surface 17, is preferably smaller than the diameter D2 of the blind hole 12 in the terminal area disposed towards the friction surface 3. In this terminal area, the blind hole 12 can end in a conical recess 14.

The conicity of the blind hole 12 is indicated by the angle $\alpha$ with respect to a parallel of the center line (a), and the conical recess 14 can have an angle $\beta$. The angle $\alpha$ preferably is an angle of about 2°, but is not to be taken as limited to this value. Thus, angle $\alpha$, in accordance with additional embodiments of the present invention, can perferably have a value of about 1°, 3°, 4°, 5°, 6°, 7°, 8°, 9°, or 10°. The angle $\beta$ is preferably an angle of about 150°, but is not to be taken as limited to this value. Thus, angle $\beta$, in accordance with additional embodiments of the present invention, can preferably have a value of about 170°, 160°, 140°, 130°, 120°, or 110°.

Figure 5:
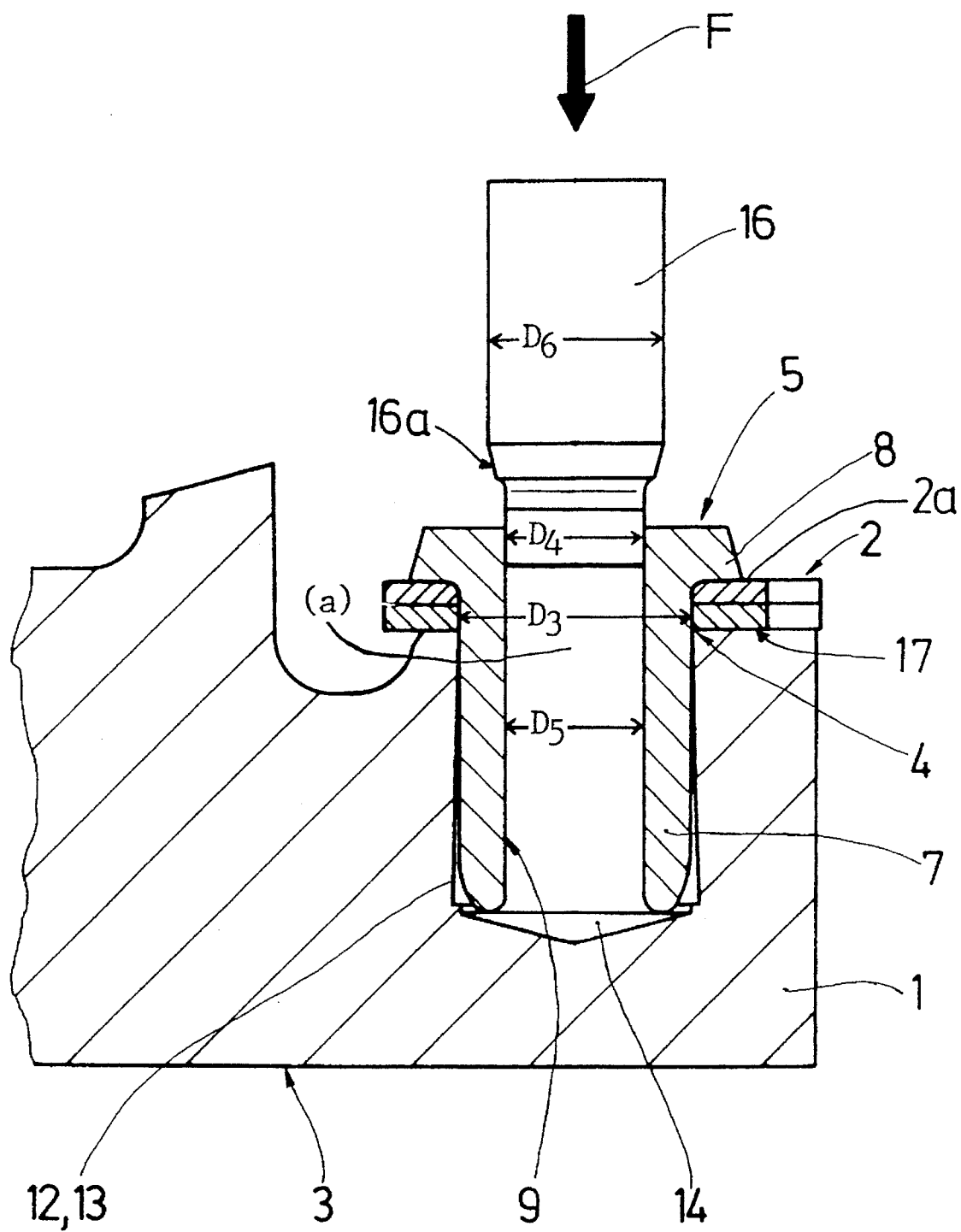
FIGS. 5 and 6 show two stages of an assembly process.

The blind hole 12 can preferably be made in a single work process, such as machining or drilling, with a single tool. After the blind hole 12 has been made, one or more tangential leaf springs 2, as shown in FIG. 5, can be placed on surface 17. The tangential leaf springs 2 can have a hole 4 having a diameter D3, which diameter D3 of hole 4 can correspond approximately to the diameter D1 of the blind hole 12 in the vicinity of the surface 17.

With further reference to FIG. 5, a pin-like portion 7 of a blind hole rivet 5 can be inserted through, or into the hole 4, and when the pin-like portion 7 is fully inserted, a collar 8 is in contact with the outermost tangential leaf spring 2a. The pin-like segment 7 is not, in this position, in contact with the conical recess 14.

Following the introduction of the blind hole rivet 5 through the holes 4 in the tangential leaf springs 2, and into the blind hole 12 of the pressure plate 1, a graduated riveting bolt 16 can be inserted, which riveting bolt 16 has an outside diameter D4 in the forward portion in the direction of insertion, which outside diameter D4 approximately equals the diameter D5 of the hole 9 of the blind hole rivet 5. The graduated riveting bolt 16 can thus be pre-fixed or held in the blind hole rivet 5 and will thus be in a position ready for further insertion. A joining force F can then be applied to the graduated riveting bolt 16 so that the latter, which has a larger diameter D6 than the diameter D5 of the hole 9, is inserted or forced into the hole 9 of the blind hole rivet 5. The material of the pin-like segment 7 can thus be plastically displaced radially outward, so that this material can essentially fill the conical blind hole 12.

Further, the riveting bolt 16 can also have a tapered portion 16a. The tapered portion 16a can aid in the insertion process of the riveting bolt 16 into the hole 9 of the blind hole rivet 5.

Figure 6:
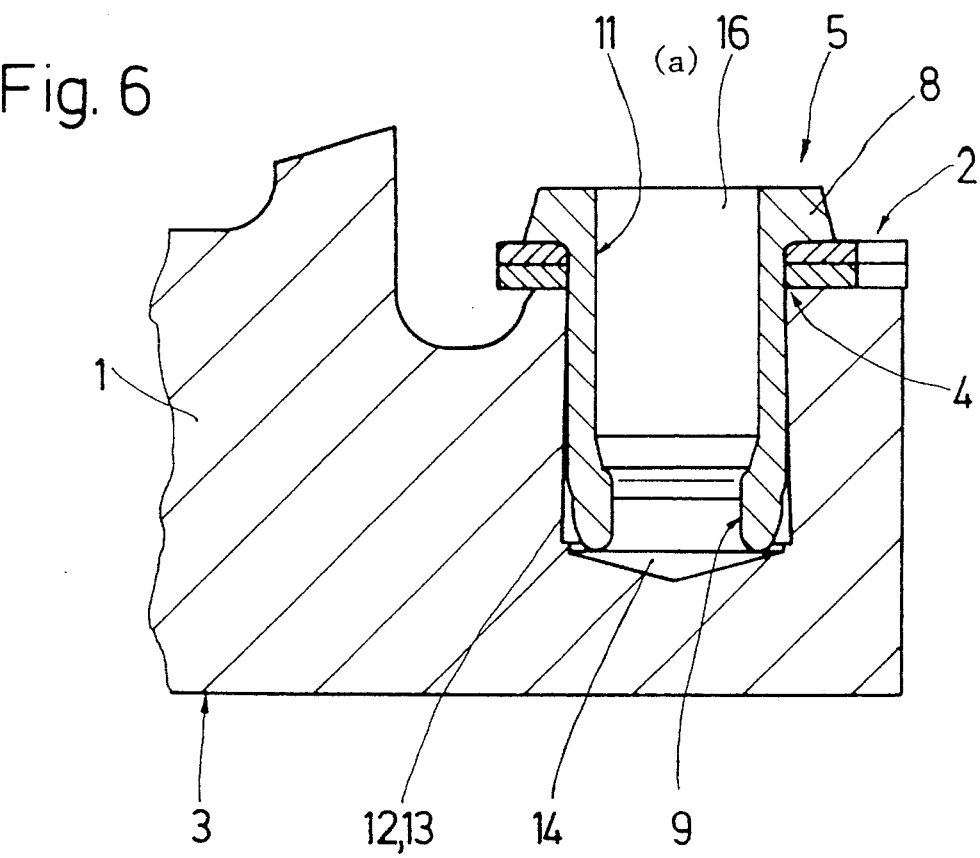

FIG. 6 illustrates the final assembly, after the graduated riveting bolt 16 has been fully inserted into the blind hole rivet 5. The original hole 9 is now expanded to the diameter 11 preferably by plastic deformation of the blind hole rivet 5, as a result of the larger outside diameter D6 of the graduated riveting bolt 16. Further, the blind hole rivet 5 is essentially permanently anchored in the blind hole 12 in order to hold the tangential leaf spring 2 on the pressure plate 1. Essentially all of the work required for the anchoring process for the blind hole rivet 5 is thereby performed on the side of the pressure plate 1 which faces away from the friction surface 3.

Figure 3:
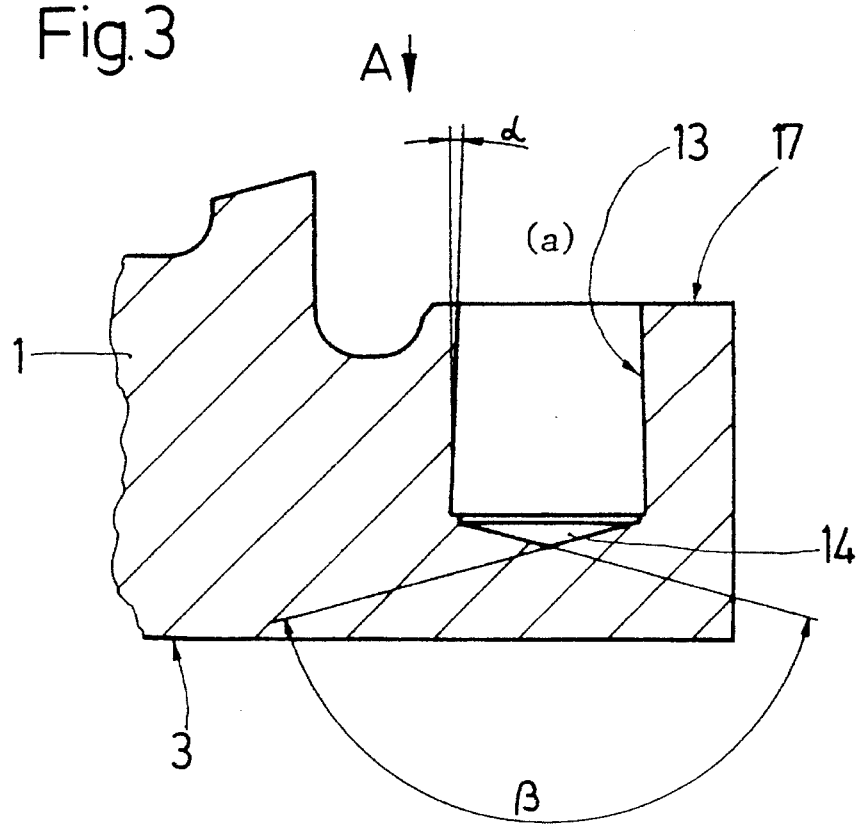
FIGS. 3 and 4 show a cross section and a plan view of a variant of the configuration illustrated in FIGS. 1 and 2, respectively.
Figure 4:
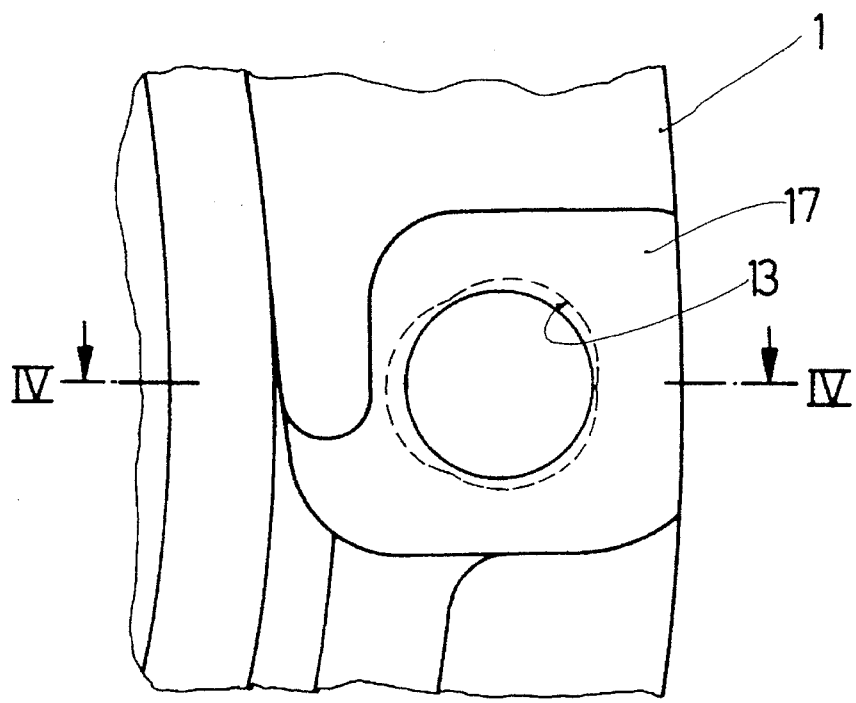

FIGS. 3 and 4 illustrate a variant of the embodiment of the present invention illustrated in FIGS. 1 and 2. Essentially the only difference between the embodiment shown in FIGS. 1 and 2 and the embodiment shown in FIGS. 3 and 4, is that in the embodiment shown in FIGS. 3 and 4, the contour of the blind hole 13, preferably in the area facing away from the surface 17, is not designed in a completely circular fashion as the embodiment shown in FIGS. 1 and 2, but can have numerous bulges distributed over the circumference. This shaping of the blind hole 3 can also be performed with a single tool, in a single work process. The process of the installation and anchoring of the blind hole rivet 5 is essentially identical to the process described with reference to FIGS. 5 and 6. The advantage of the embodiment illustrated in FIGS. 3 and 4 preferably is that the blind hole rivet 5 has a particularly good anchoring in the circumferential direction.

Figure 7:
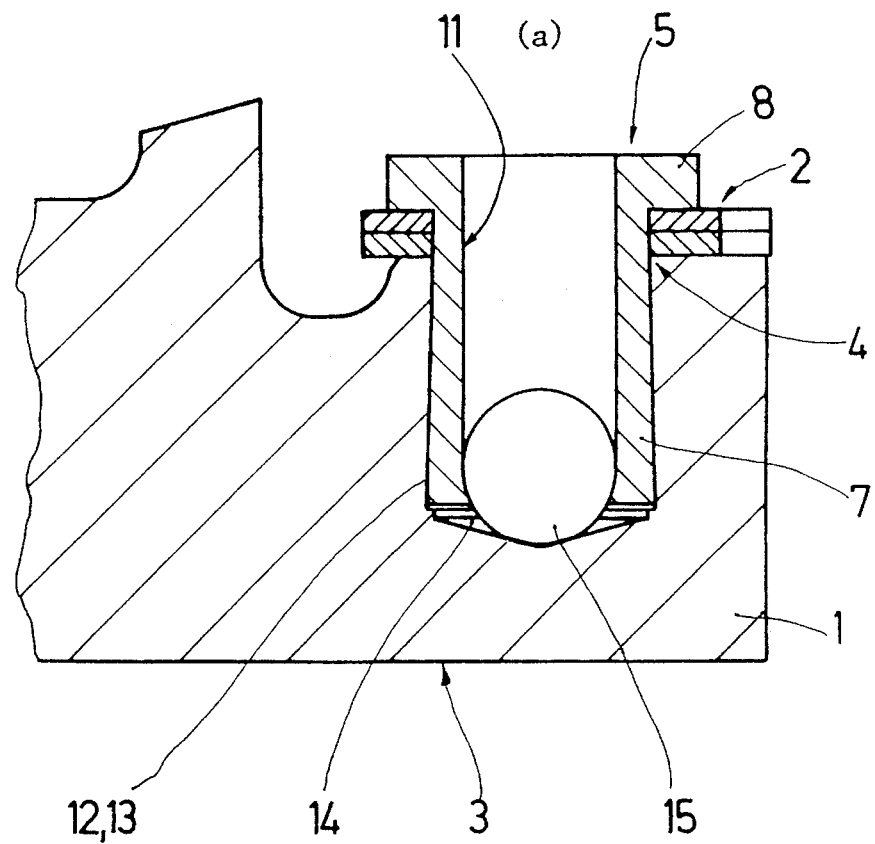
FIG. 7 shows the use of a sphere as the anchoring element.

FIG. 7 illustrates an embodiment of the present invention in which, in contrast to FIGS. 5 and 6, an anchoring element preferably in the form of a sphere 15 can be used. It should be noted that FIG. 7 shows the sphere 15 after insertion into the hole 9. The rest of the structure and assembly are essentially identical to the structure and assembly shown in FIGS. 5 and 6. The sphere 15 can preferably be inserted in the still narrow hole 9 (i.e. when hole 9 still has a diameter substantially equal to the diameter D5 and can be driven into the conical recess 14 with a suitable tool. The larger hole 11 is thus produced, and the material of the pin-like segment 7 of the blind hole rivet 5 can preferably be plastically displaced radially outward into the blind holes 12 (with regard to the embodiment shown in FIGS. 1 and 2) or 13 (with regard to FIGS. 3 and 4). The advantage of the embodiment shown in FIG. 7 is that during the handling of the sphere 15, essentially no special attention need be paid to the correct insertion before assembly, because the sphere 15 will essentially center itself in the hole 9.

FIG. 8 illustrates an additional possible embodiment of the blind hole rivet of the present invention. It should be noted that FIG. 8 shows the sphere 15 after insertion into hole 10. In this embodiment, a blind hole rivet 6 can preferably be used, which blind hole rivet 6 does not have a continuous hole, but which blind hole rivet 6 has a blind hole 10 in a terminal area at the base of the blind hole 12 (conical recess 14). Before the installation of the blind hole rivet 6 into blind hole 12, a sphere 15 can be placed in the conical recess 14, whereby the diameter D7 of the sphere 15 can be coordinated with the diameter D8 of the blind hole 10, so that when the blind hole rivet 6 is introduced, and after a force F is applied, the sphere 15 can penetrate into the blind hole 10. The pin-like segment 7, in the vicinity of the sphere 15, is plastically deformed radially outward. Thus, a plastically deformed opening 11 can be formed, whereby the material of the blind hole rivet 6 can penetrate into the conical blind holes 12 (with regard to FIGS. 1 and 2) and 13 (with regard to FIGS. 3 and 4). The advantage of the embodiment shown in FIGS. 8 and 8a is that the sphere 15, which is inserted or placed in conical recess 14 first, is self-centering in the conical recess 14, and the subsequent introduction of the blind hole rivet 6 can be done essentially without any additional manipulations of the sphere 15. The result is typically a simplified assembly process.

Figure 9:
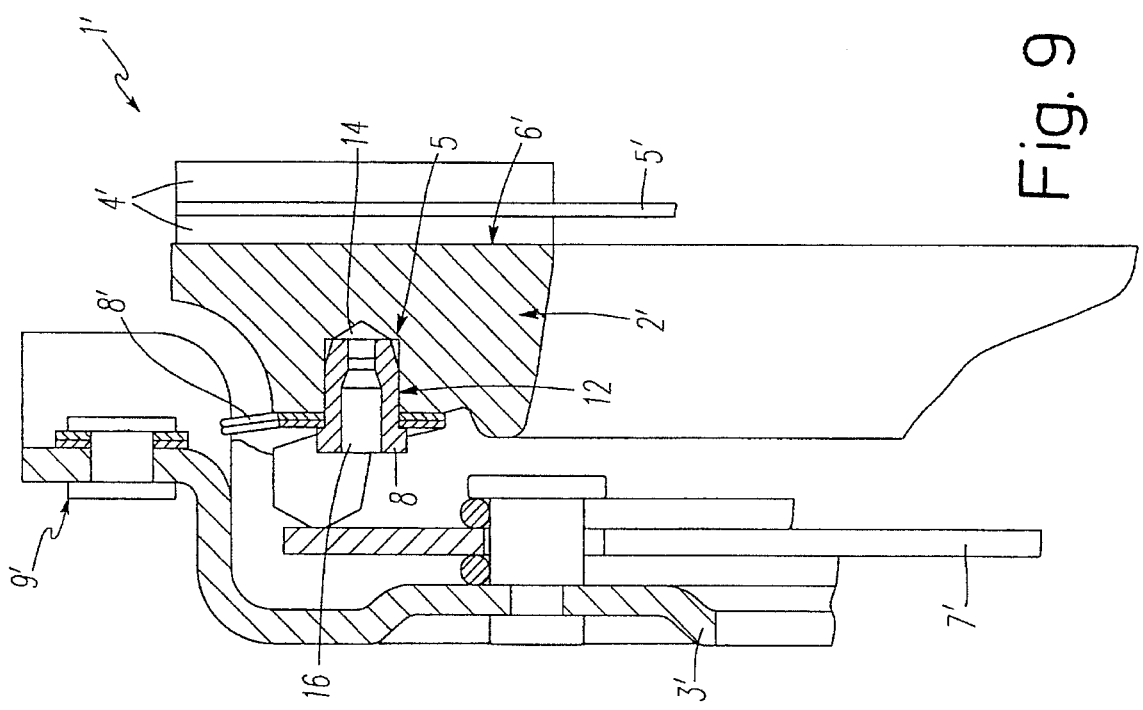
FIG. 9 shows a friction clutch assembly in which the embodiments of the present invention may be incorporated.

FIG. 9 shows the upper half of a typical friction clutch assembly in which the embodiments of the present invention could be incorporated. The friction clutch 1' can preferably include a pressure plate 2', which pressure plate 2' can preferably be mounted in a clutch housing 3' so that the pressure plate 2' is not rotatable, but is axially moveable with respect to the friction linings 4' of a clutch disc 5'. The pressure plate 2' can preferably have a friction surface 6', which friction surface 6' makes contact with the friction linings 4' when the friction clutch 1' is engaged. The friction clutch 1' can also include a release mechanism 7' for releasing the pressure plate 2' from the friction linings 4' of the clutch disc 5'.

The friction clutch 1' can also include tangential leaf springs 8', which leaf springs 8' can serve to fasten the pressure plate 2' to the clutch housing 3'. The tangential leaf springs 8' can be fastened at one end thereof to the clutch housing 3' by means of a rivet 9', or other suitable fastening device. In addition, if the pressure plate 2' is provided with a blind hole 12 in accordance with the present invention, the other end of the leaf springs 8' can be fastened to the pressure plate 2' by means of a blind hole rivet 5, and a riveting bolt 16, in accordance with the present invention.

It should be understood that all of the embodiments of the present invention disclosed herein can preferably be utilized with the friction clutch assembly shown in FIG. 9.

Figure 10:
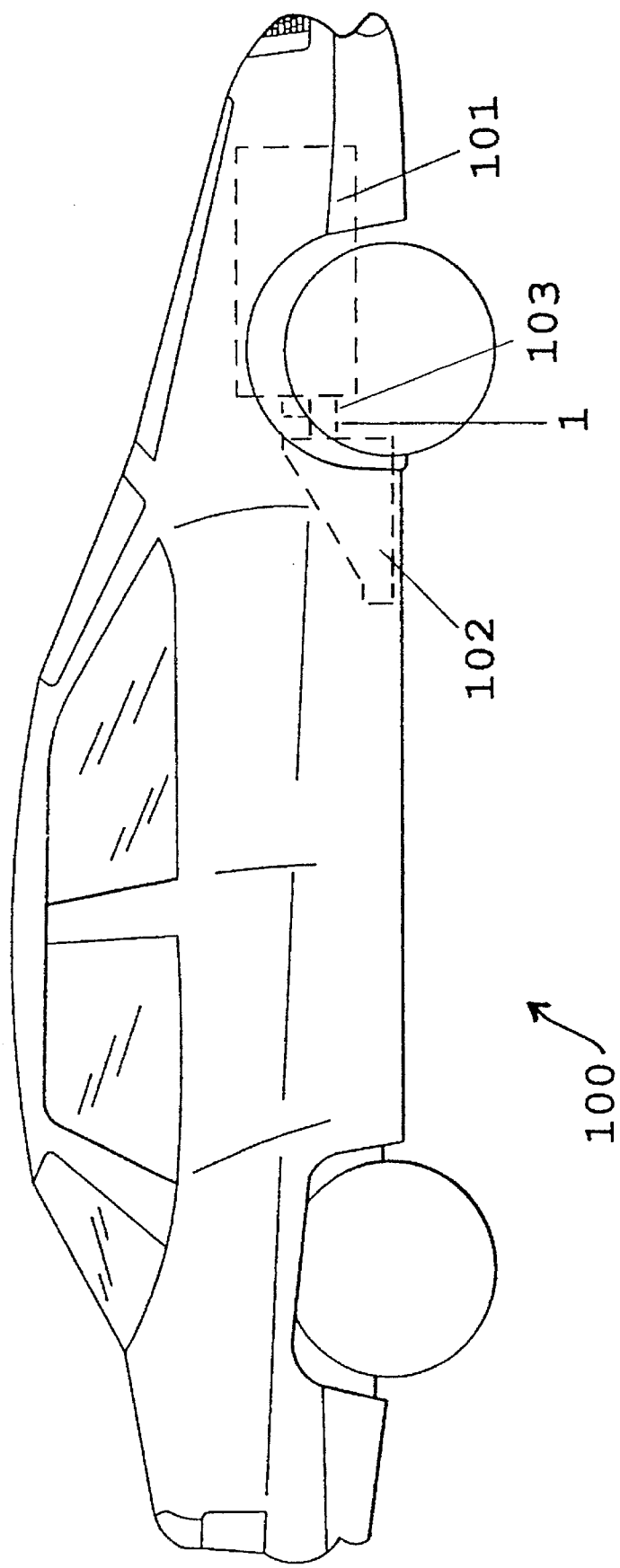
FIG. 10 shows a typical motor vehicle in which the embodiments of the present invention may be incorporated.

FIG. 10 shows what could be considered to be a typical motor vehicle 100, which motor vehicle typically includes an internal combustion engine 101, preferably mounted in the forward portion thereof. The motor vehicle could also typically include a transmission 102 for transmission of mechanical power from the engine 101 to the wheels. If the motor vehicle 100 has a manual transmission 102, a friction clutch 103 will typically also be provided, which friction clutch 103 can have a pressure plate 1. Further, the pressure plate 1 can be fastened to the clutch housing (not shown here) in accordance with the embodiments of the present invention.

Figure 11:
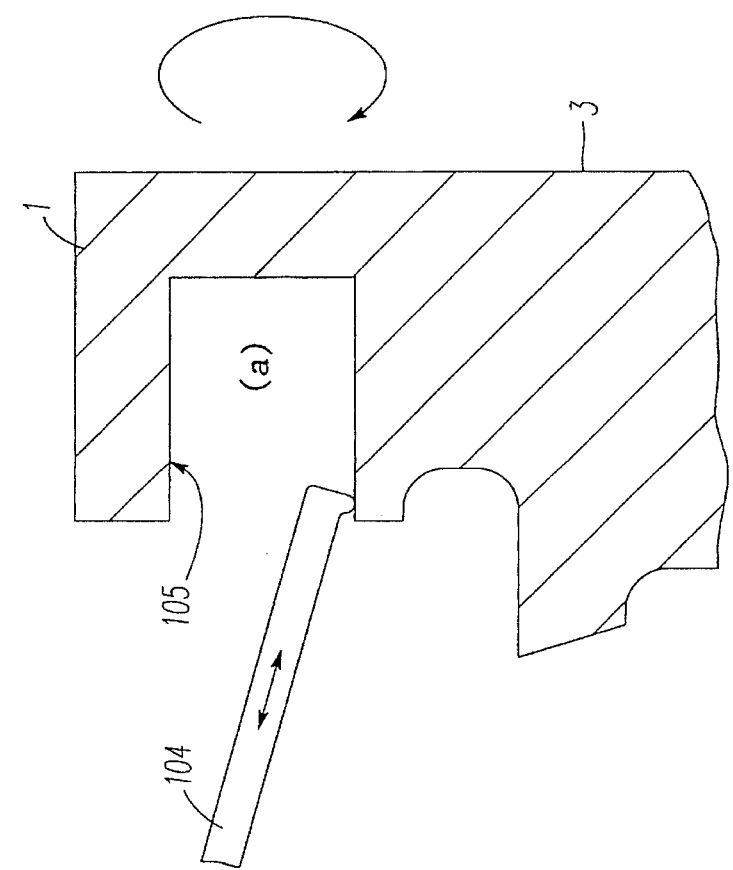
FIG. 11 shows an example of a boring method which can be used in accordance with the embodiments of the present invention.

FIG. 11 illustrates one possible method of boring the blind hole 12, 13. First, the pressure plate 1 can be mounted for rotation on a lathe, or other suitable device. A substantially cylindrical blind hole 105 can then be bored or drilled in the pressure plate 1 with a boring bar 104, or other suitable device, as shown in FIG. 11. A typical drill bit already has a conical tip, and thus, providing a first bore with a drill bit can produce the conical bottom 14 in accordance with the present invention. The boring bar 104 can be angled by a predetermined amount and can be positioned as indicated in FIG. 11 in order to bore a conical hole having a larger diameter nearest the base of the blind hole, 105 and a smaller diameter nearest the open end of the blind hole 105 in order to produce the blind hole 12, 13.

In accordance with the embodiment of the present invention illustrated in FIGS. 3 and 4, after an initial bore is made, as discussed above, 3 additional boring operating could be performed in order to produce the lobes or bulges of the finished bore 13.

Further methods of boring, various lathe operations, and boring operations are discussed in the publication "Modern Machining Technology" by Richard Baril, published in 1987 by Delmar Publishers on pages 261–286.

Various devices, machinery and methods of boring which may be used in accordance with the embodiments of the present invention are disclosed in the following U.S. Pat. No. 4,510,828 to Bogaerts et al on Apr. 16, 1985, entitled "Lathe Cross Feed Assembly"; U.S. Pat. No. 4,235,135 to McElroy on Nov. 25, 1980, entitled "Boring Bar Attachment for Engine Lathes"; and U.S. Pat. No. 4,096,771 to Monro on Jun. 27, 1978, entitled "Adjustable and Floating Boring Bar Stabilizer".

Types of friction clutches utilizing tangential leaf spring attachments are disclosed in the following U.S. Pat. No. 4,640,398 to Kolb et al. on Feb. 3, 1987, entitled "Friction Clutch with Tangential Leaf Springs"; and U.S. Pat. No. 4,616,744 to Tomm et al. on Oct. 14, 1986, entitled "Friction Clutch Unit with a Stop Element for Limiting Pressure Plate Travel".

Types of friction clutches in which the embodiments of the present invention may be incorporated are disclosed in the following U.S. Pat. No. 4,684,007 to Maucher on Aug. 4, 1987, entitled "Clutch Plate"; and U.S. Pat. No. 4,635,780 to Wiggen on Jan. 13, 1987, entitled "Clutch Disc for a Motor Vehicle Friction Clutch"; and U.S. Pat. No. 4,651,857 to Schraut et al. on Mar. 24, 1987, entitled "Clutch Disc Unit for a Motor Vehicle Clutch".

One feature of the invention resides broadly in the friction clutch, comprising a pressure plate located in a clutch housing so that it cannot rotate but can be displaced axially, which is pressurized by a clutch spring, tangential leaf springs, or other components which are fastened on one hand to the clutch housing and on the other hand to the side of the pressure plate facing the friction surface by means of a blind hole rivet which, with a pin-like segment, penetrates a corresponding hole in the tangential leaf spring, and is in contact with a collar on the side of the tangential leaf spring facing away from the pressure plate, also comprising a blind hole located inside the radial extension of the friction surface of the pressure plate, in which the rivet is placed with its pin-like segment and is plastically deformed radially, characterized by the fact that the blind hole 12, 13 is conical, with the larger diameter in the vicinity of the base of the blind hole, and the radial plastic deformation of the pin-like segment 7 occurs at least in the vicinity near the base of the blind hole.

Another feature of the invention resides broadly in the friction clutch characterized by the fact that the blind hole rivet 5 has a continuous longitudinal hole 9, into which an anchoring element 16 is driven.

Yet another feature of the invention resides broadly in the friction clutch characterized by the fact that the anchoring element is designed as a sphere 15.

Still another feature of the invention resides broadly in the friction clutch characterized by the fact that the blind hole rivet 6, in its terminal area facing the base of the blind hole (conical recess 14), has a blind hole 1 into which, during the riveting process, a sphere 15 previously placed on the bottom of the blind hole is driven.

A further feature of the invention resides broadly in the friction clutch characterized by the fact that the base of the blind hole is provided with a conical recess 14.

All, or substantially all, of the components and methods of the various embodiments may be used with at least one embodiment or all of the embodiments, if any, described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. P 43 24 588.9, filed on Jul. 22, 1993, having inventors Peter Eichelsbacher, Christoph Feuchter, and Bernhard Stephan, and DE-OS P43 24 588.9 and DE-PS P43 24 588.9 are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The appended drawings in their entirety, including all dimensions, proportions and/or shapes in at least one embodiment of the invention, are accurate and to scale and are hereby included by reference into this specification.

The invention as described hereinabove in the context of the preferred embodiments is not to be taken as limited to all of the provided details thereof, since modifications and variations thereof may be made without departing from the spirit and scope of the invention.

What is claimed is:

1. A friction clutch for a motor vehicle, said friction clutch comprising:

a clutch disc having an axis of rotation;

a clutch housing;

a pressure plate, said pressure plate having means for permitting axial movement of said pressure plate with respect to said clutch disc;

said pressure plate comprising a first surface disposed immediately adjacent said clutch disc;

said pressure plate comprising a second surface disposed opposite said first surface;

first fastening means for fastening said pressure plate to said clutch housing;

second fastening means for fastening said first fastening means to said second surface of said pressure plate;

said second fastening means comprising orifice means disposed in said pressure plate, said orifice means having a longitudinal axis extending substantially parallel to said axis of rotation, from said second surface towards said first surface;

said orifice means comprising a first portion having a first dimension disposed transverse to said longitudinal axis, said first dimension of said first portion being disposed at a first location;

said orifice means comprising a second portion having a second dimension disposed transverse to said longitudinal axis, said second dimension of said second portion being disposed at a second location, said second location being disposed at a greater distance from said second surface of said pressure plate than said first location;

said first dimension being smaller than said second dimension;

said orifice means having a depth dimension defined between said second surface of said pressure plate and said second location;

said second fastening means further comprising expansion means being expanded in a radial direction substantially transverse to said longitudinal axis, said expansion means for making contact with at least said first portion of said orifice means and said second portion of said orifice means;

said orifice means further comprises a third portion disposed between said first portion and said second portion, said third portion comprising a substantially frustoconical shape;

said expansion means comprising:

means for expanding, said means for expanding comprising:

a first end and a second end disposed axially from one another, said first end being disposed adjacent said second surface of said pressure plate and said second end being disposed maximally from said second surface of said pressure plate;

an outer surface facing said orifice means, said outer surface being substantially straight from said first end to said second end of said means for expanding; and said second end of said means for expanding comprising an open portion;

anchoring means, said anchoring means having been driven into said open portion for causing said means for expanding to expand in said orifice means, said anchoring means comprising one of a) and b):

a) an anchoring element having at least one cylindrical portion, said at least one cylindrical portion having a length defined parallel to said longitudinal axis, said length of said at least one cylindrical portion being substantially equal to said depth dimension of said orifice means; and b) a sphere.

2. The friction clutch according to claim 1 wherein:

said orifice means further comprises a plurality of recessed portions, each of said plurality of recessed portions extending radially outwardly, transverse to said longitudinal axis;

said plurality of recessed portions being disposed in an undulating manner about said longitudinal axis, said plurality of recessed portions undulating circumferentially with respect to said longitudinal axis; and said means for expanding being expanded in a radial direction into said plurality of recessed portions, to secure said expansion means in a circumferential direction.

3. The friction clutch according to claim 2 wherein said third portion has a continuously increasing diameter, in a direction transverse to said longitudinal axis, from said first dimension to said second dimension to form a tapered surface; and said orifice means comprises a blind hole.

4. The friction clutch according to claim 3 wherein:

the difference between said first dimension and said second dimension is sufficient to maintain a connected state between said first fastening means and said pressure plate, to minimize separation of said first fastening means from said pressure plate; and said tapered surface of said third portion forming an angle with respect to a parallel of said longitudinal axis, said angle having a value in a range of 1° to 10°.

5. The friction clutch according to claim 4 wherein:

said friction clutch comprises one of the following sets of characteristics c), d) and e):

c) said anchoring means consists essentially of said a); said open portion of said means for expanding comprises:

a hole disposed within said means for expanding, said hole extending from said first end to said second end; and said anchoring element is disposed in at least a portion of said hole;

said first fastening means comprises a plurality of leaf springs each having a first end and a second end;

said first ends of said plurality of leaf springs are fastened to said clutch housing;

said second ends of said plurality of leaf springs comprise means for receiving said expansion means, said expansion means being disposed in said receiving means of said plurality of leaf springs;

said means for expanding comprises a flanged portion disposed at said first end to secure said second ends of said plurality of leaf springs against said second surface of said pressure plate, said flanged portion extending in a direction substantially transverse to said longitudinal axis;

said orifice means comprises a fourth portion disposed at said second end of said means for expanding and disposed adjacent said second portion of said orifice means;

said fourth portion comprises a substantially conical shape;

said friction clutch having an engaged position and a disengaged position;

said clutch disc comprising friction linings disposed to contact said first surface of said pressure plate when said friction clutch is in said engaged position;

said friction clutch further comprising means for permitting said pressure plate to move away from said clutch disc;

said means for expanding being plastically deformed in a radial direction for making contact with at least said first portion of said orifice means, said second portion of said orifice means, and said third portion of said orifice means;

said means for expanding being disposed substantially concentrically about said longitudinal axis;

said at least one cylindrical portion has a first diameter disposed transverse to said longitudinal axis; said anchoring means further comprises:

a tapered portion having at least one second diameter smaller than said first diameter, said at least one second diameter being disposed transverse to said longitudinal axis;

a terminal portion having a substantially cylindrical shape and a third diameter smaller than said first diameter and said at least one second diameter, said third diameter being disposed transverse to said longitudinal axis;

said terminal portion is disposed adjacent said fourth portion; and said tapered portion is disposed between said at least one cylindrical portion and said terminal portion; said angle is about 2°; and d) said anchoring means consists essentially of said b);

said open portion of said means for expanding comprises:

a hole disposed within said means for expanding, said hole extending from said first end to said second end; and said sphere is disposed in at least a portion of said hole;

said sphere comprises a first portion, said first portion of said sphere being disposed in at least a portion of said hole of said means for expanding;

said first fastening means comprises a plurality of leaf springs each having a first end and a second end;

said first ends of said plurality of leaf springs are fastened to said clutch housing;

said second ends of said plurality of leaf springs comprise means for receiving said expansion means, said expansion means being disposed in said receiving means of said plurality of leaf springs;

said means for expanding comprises a flanged portion disposed at said first end of said means for expanding to secure said second ends of said plurality of leaf springs against said second surface of said pressure plate, said flanged portion extending in a direction substantially transverse to said longitudinal axis;

said orifice means comprises a fourth portion disposed at said second end of said means for expanding and disposed adjacent said second portion of said orifice means;

said fourth portion comprises a substantially conical shape;

said sphere further comprises a second portion, said second portion of said sphere being disposed in said fourth portion of said orifice means;

said friction clutch having an engaged position and a disengaged position;

said clutch disc comprising friction linings disposed to contact said first surface of said pressure plate when said friction clutch is in said engaged position;

said friction clutch further comprising means for permitting said pressure plate to move away from said clutch disc;

said means for expanding being plastically deformed in a radial direction for making contact with at least said first portion of said orifice means, said second portion of said orifice means, and said third portion of said orifice means;

said means for expanding being disposed substantially concentrically about said longitudinal axis;

said angle is about 2°; and e) said anchoring means consists essentially of said b); said open portion of said means for expanding comprises:

a hole disposed within said means for expanding extending axially from said second end towards said first end, said hole extending into at least a portion of said means for expanding;

said sphere comprises a first portion disposed in at least a portion of said hole;

said hole comprises a blind hole;

said orifice means comprises a fourth portion disposed at said second end of said means for expanding and disposed adjacent said second portion of said orifice means;

said fourth portion comprises a substantially conical shape;

said sphere comprises a second portion, said second portion of said sphere being disposed in at least a portion of said fourth portion of said orifice means;

said first fastening means comprises a plurality of leaf springs each having a first end and a second end;

said first ends of said plurality of leaf springs are fastened to said clutch housing;

said second ends of said plurality of leaf springs comprise means for receiving said expansion means, said expansion means being disposed in said receiving means of said plurality of leaf springs;

said means for expanding comprises a flanged portion disposed at said first end of said means for expanding to secure said second end of said at least one leaf spring against said second surface of said pressure plate, said flanged portion extending in a direction substantially transverse to said longitudinal axis;

said orifice means comprises a fourth portion disposed at said second end of said means for expanding and disposed adjacent said second portion of said orifice means;

said fourth portion comprises a substantially conical shape;

said friction clutch having an engaged position and a disengaged position;

said clutch disc comprising friction linings disposed to contact said first surface of said pressure plate when said friction clutch is in said engaged position;

said friction clutch further comprising means for permitting said pressure plate to move away from said clutch disc;

said means for expanding being plastically deformed in a radial direction transverse to said longitudinal axis for making contact with at least said first portion of said orifice means, said second portion of said orifice means and said third portion of said orifice means;

said means for expanding being disposed substantially concentrically about said longitudinal axis; and said angle is about 2°.

6. A friction clutch for a motor vehicle, said friction clutch comprising:

a clutch disc having an axis of rotation;

a clutch housing;

a pressure plate, said pressure plate having means for permitting axial movement of said pressure plate with respect to said clutch disc;

said pressure plate comprising a first surface disposed immediately adjacent said clutch disc;

said pressure plate comprising a second surface disposed opposite said first surface;

first fastening means for fastening said pressure plate to said clutch housing;

second fastening means for fastening said first fastening means to said second surface of said pressure plate;

said second fastening means comprising orifice means disposed in said pressure plate, said orifice means having a longitudinal axis extending substantially parallel to said axis of rotation, from said second surface towards said first surface;

said orifice means comprising a first portion having a first dimension disposed transverse to said longitudinal axis, said first dimension of said first portion being disposed at a first location;

said orifice means comprising a second portion having a second dimension disposed transverse to said longitudinal axis, said second dimension of said second portion being disposed at a second location, said second location being disposed at a greater distance from said second surface of said pressure plate than said first location;

said first dimension being smaller than said second dimension;

said second fastening means further comprising expansion means being expanded in a radial direction substantially transverse to said longitudinal axis, said expansion means for making contact with at least said first portion of said orifice means and said second portion of said orifice means;

said orifice means further comprising a plurality of recessed portions, each of said plurality of recessed portions extending radially outwardly, transverse to said longitudinal axis;

said plurality of recessed portions being disposed in an undulating manner about said longitudinal axis, said plurality of recessed portions undulating circumferentially with respect to said longitudinal axis; and said expansion means also being expanded in a radial direction into said plurality of recessed portions, to secure said expansion means in a circumferential direction.

7. The friction clutch according to claim 6 wherein:

said orifice means has a depth dimension defined between said second surface of said pressure plate and said second location;

said expansion means comprises:

means for expanding, said means for expanding comprising:

a first end and a second end disposed axially from one another, said first end being disposed adjacent said second surface of said pressure plate and said second end being disposed maximally from said second surface of said pressure plate;

an outer surface facing said orifice means, said outer surface being substantially straight from said first end to said second end of said means for expanding; and said second end of said means for expanding comprising an open portion;

anchoring means, said anchoring means having been driven into said open portion for causing said means for expanding to expand in said orifice means;

said anchoring means comprising one of a) and b):

a) an anchoring element having at least one cylindrical portion, said at least one cylindrical portion having a length defined parallel to said longitudinal axis, said length of said at least one cylindrical portion being substantially equal to said depth dimension of said orifice means; and b) a sphere.

8. The friction clutch according to claim 7 wherein said orifice means further comprises a third portion disposed between said first portion and said second portion, said third portion having a continuously increasing diameter, in a direction transverse to said longitudinal axis, from said first dimension to said second dimension to form a tapered surface.

9. The friction clutch according to claim 8 wherein said orifice means comprises a blind hole.

10. The friction clutch according to claim 9 wherein said third portion of said orifice means comprises a substantially conical portion, said substantially conical portion comprising said tapered surface.

11. The friction clutch according to claim 10 wherein the difference between said first dimension and said second dimension is sufficient to maintain a connected state between said first fastening means and said pressure plate, to minimize separation of said first fastening means from said pressure plate.

12. The friction clutch according to claim 11 wherein said open portion of said means for expanding comprises:

a hole disposed within said means for expanding, said hole extending from said first end to said second end; and said anchoring means is disposed in at least a portion of said hole.

13. The friction clutch according to claim 12 wherein:

said tapered surface of said third portion forms an angle with respect to a parallel of said longitudinal axis, said angle having a value of about 2°;

said first fastening means comprises a plurality of leaf springs each having a first end and a second end;

said first ends of said plurality of leaf springs are fastened to said clutch housing;

said second ends of said plurality of leaf springs comprise means for receiving said expansion means, said expansion means being disposed in said receiving means of said plurality of leaf springs;

said means for expanding comprises a flanged portion disposed at said first end of said means for expanding to secure said second ends of said plurality of leaf springs against said second surface of said pressure plate, said flanged portion extending in a direction substantially transverse to said longitudinal axis;

said orifice means comprises a fourth portion disposed at said second end of said means for expanding and disposed adjacent said second portion of said orifice means;

said fourth portion comprises a substantially conical shape;

said friction clutch having an engaged position and a disengaged position;

said clutch disc comprising friction linings disposed to contact said first surface of said pressure plate when said friction clutch is in said engaged position;

said friction clutch further comprising means for permitting said pressure plate to move away from said clutch disc;

said means for expanding being plastically deformed in a radial direction for making contact with at least said first portion of said orifice means, said second portion of said orifice means and said third portion of said orifice means;

said means for expanding being disposed substantially concentrically about said longitudinal axis;

said anchoring means consists essentially of said a);

said at least one cylindrical portion has a first diameter disposed transverse to said longitudinal axis;

said anchoring means further comprises:
a tapered portion having at least one second diameter smaller than said first diameter, said at least one second diameter being disposed transverse to said longitudinal axis;
a terminal portion having a substantially cylindrical shape and a third diameter smaller than said first diameter and said at least one second diameter, said third diameter being disposed transverse to said longitudinal axis;
said terminal portion is disposed adjacent said fourth portion; and
said tapered portion is disposed between said at least one cylindrical portion and said terminal portion.

14. The friction clutch according to claim 12 wherein said anchoring means consists essentially of said b); and
said sphere comprises a first portion, said first portion of said sphere being disposed in at least a portion of said hole of said means for expanding.

15. The friction clutch according to claim 14 wherein:
said first fastening means comprises a plurality of leaf springs each having a first end and a second end;
said first ends of said plurality of leaf springs are fastened to said clutch housing;
said second ends of said plurality of leaf springs comprise means for receiving said expansion means, said expansion means being disposed in said receiving means of said plurality of leaf springs;

said means for expanding comprises a flanged portion disposed at said first end of said means for expanding to secure said second ends of said plurality of leaf springs against said second surface of said pressure plate, said flanged portion extending in a direction substantially transverse to said longitudinal axis;

said orifice means comprises a fourth portion disposed at said second end of said means for expanding and disposed adjacent said second portion of said orifice means;

said fourth portion comprises a substantially conical shape;

said sphere further comprises a second portion, said second portion of said sphere being disposed in said fourth portion of said orifice means;

said friction clutch having an engaged position and a disengaged position;

said clutch disc comprising friction linings disposed to contact said first surface of said pressure plate when said friction clutch is in said engaged position;

said friction clutch further comprising means for permitting said pressure plate to move away from said clutch disc;

said means for expanding being plastically deformed in a radial direction for making contact with at least said first portion of said orifice means, said second portion of said orifice means and said third portion of said orifice means;

said means for expanding being disposed substantially concentrically about said longitudinal axis; and said tapered surface of said third portion forms an angle with respect to a parallel to said longitudinal axis, said angle having a value of about 2°.

16. The friction clutch according to claim 11 wherein:
said open portion of said means for expanding comprises:
a hole disposed within said means for expanding extending axially from said second end towards said first end, said hole extending into at least a portion of said means for expanding;
said anchoring means consists essentially of said b);
said sphere comprises a first portion disposed in at least a portion of said hole of said means for expanding; and
said tapered surface of said third portion forming an angle with respect to a parallel of said longitudinal axis, said angle having a value in the range of 1° to 10°.

17. The friction clutch according to claim 16 wherein:
said hole comprises a blind hole;
said orifice means comprises a fourth portion disposed at said second end of said means for expanding and disposed adjacent said second portion of said orifice means;
said fourth portion comprises a substantially conical shape;
said sphere comprises a second portion, said second portion of said sphere being disposed in at least a portion of said fourth portion of said orifice means;
said first fastening means comprises a plurality of leaf springs each having a first end and a second end;
said first ends of said plurality of leaf springs are fastened to said clutch housing;
said second ends of said plurality of leaf springs comprise means for receiving said expansion means, said expansion means being disposed in said receiving means of said plurality of leaf springs;

said means for expanding comprises a flanged portion disposed at said first end of said means for expanding to secure said second ends of said plurality of leaf springs against said second surface of said pressure plate, said flanged portion extending in a direction substantially transverse to said longitudinal axis;

said orifice means comprises a fourth portion disposed at said second end of said means for expanding and disposed adjacent said second portion of said orifice means;

said fourth portion comprises a substantially conical shape;

said friction clutch having an engaged position and a disengaged position;

said clutch disc comprising friction linings disposed to contact said first surface of said pressure plate when said friction clutch is in said engaged position;

said friction clutch further comprising means for permitting said pressure plate to move away from said clutch disc;

said means for expanding being plastically deformed in a radial direction transverse to said longitudinal axis for making contact with at least said first portion of said orifice means, said second portion of said orifice means and said third portion of said orifice means;

said means for expanding being disposed substantially concentrically about said longitudinal axis; and said angle is about 2°.

18. A method of making a friction clutch for a motor vehicle, the friction clutch comprising: a clutch disc having an axis of rotation; a clutch housing; a pressure plate, the pressure plate having means for permitting axial movement of the pressure plate with respect to the clutch disc; the pressure plate comprising a first surface disposed immediately adjacent the clutch disc; the pressure plate comprising a second surface disposed opposite the first surface; first fastening means for fastening the pressure plate to the clutch housing; second fastening means for fastening the first fastening means to the second surface of the pressure plate; the second fastening means comprising orifice means disposed in the pressure plate, the orifice means having a longitudinal axis extending substantially parallel to the axis of rotation from the second surface towards the first surface; the orifice means comprising a first portion having a first dimension disposed transverse to the longitudinal axis, the first dimension of the first portion being disposed at a first location; the orifice means comprising a second portion having a second dimension disposed transverse to the longitudinal axis, the second dimension of the second portion being disposed at a second location, the second location being disposed at a greater distance from the second surface of the pressure plate than the first location; the first dimension being smaller than the second dimension; the second fastening means further comprising expansion means being expanded in a radial direction substantially transverse to the longitudinal axis, the expansion means for making contact with at least the first portion of the orifice means and said second portion of the orifice means; the orifice means further comprising a plurality of recessed portions, each of the plurality of recessed portions extending radially outwardly, transverse to the longitudinal axis; the plurality of recessed portions being disposed in an undulating manner about the longitudinal axis, the plurality of recessed portions undulating circumferentially with respect to the longitudinal axis; and the expansion means also being expanded in a radial direction into the plurality of recessed portions, to secure the expansion means in a circumferential direction; said method comprising the steps of:

providing a clutch disc having an axis of rotation;

providing a clutch housing;

providing a pressure plate, the pressure plate having means for permitting axial movement of the pressure plate with respect to the clutch disc;

said step of providing the pressure plate comprises providing a first surface;

disposing the first surface immediately adjacent the clutch disc;

said step of providing the pressure plate comprises providing a second surface;

disposing the second surface opposite the first surface;

providing first fastening means for fastening the pressure plate to the clutch housing;

fastening the pressure plate to the clutch housing with the first fastening means;

providing second fastening means for fastening the first fastening means to the second surface of the pressure plate;

fastening the first fastening means to the second surface of the pressure plate with the second fastening means;

said providing of the second fastening means further comprises providing expansion means;

said method further comprising the steps of:
  boring orifice means in the second surface of the pressure plate, the orifice means having a longitudinal axis, extending substantially parallel to the axis of rotation, the orifice means extending from the second surface towards the first surface;
  said step of boring the orifice means further comprises:
    forming a first portion of the orifice means, the first portion having a first dimension disposed transverse to the longitudinal axis, the first dimension of the first portion being disposed at a first location;
    forming a second portion having a second dimension disposed transverse to the longitudinal axis, the second dimension of the second portion being disposed at a second location, the second location being disposed at a greater distance from the second surface of the pressure plate than the first location, the first dimension being smaller than the second dimension;
    forming a plurality of recessed portions extending radially outwardly, transverse to the longitudinal axis;
    disposing the plurality of recessed portions in an undulating manner about the longitudinal axis, the plurality of recessed portions undulating circumferentially with respect to the longitudinal axis;
  driving the expansion means into the orifice means and expanding the expansion means in a radial direction such that the expansion means makes contact with at least the first portion of the orifice means and the second portion of the orifice means; and
  further driving the expansion means into the orifice means and expanding the expansion means in a radial direction into the plurality of recessed portions and securing the expansion means in a circumferential direction.

* * * * *

UNITED STATES PATENT AND TRADEMARK OFFICE
CERTIFICATE OF CORRECTION

PATENT NO. : 5,584,372
DATED : December 17, 1996
INVENTOR(S) : Peter EICHELSBACHER, Christoph FEUCHTER and Bernhard STEPHAN It is certified that error appears in the above-indentified patent and that said Letters Patent is hereby corrected as shown below:

In column 2, lines 33-34, after 'can' delete "preferably".

In column 4, line 32, after 'diameter', delete "D5" and insert --D5)--.

Signed and Sealed this

Third Day of June, 1997

Attest:

Attesting Officer

BRUCE LEHMAN

Commissioner of Patents and Trademarks